United States Patent
Giammarco

[15] 3,659,401
[45] May 2, 1972

[54] GAS PURIFICATION PROCESS

[72] Inventor: Giuseppe Giammarco, Venice, Italy

[73] Assignee: Vetrocoke Cokapuania S.p.A., Venezia Porto Marghera, Italy

[22] Filed: Oct. 13, 1969

[21] Appl. No.: 865,849

[30] Foreign Application Priority Data

Oct. 12, 1968  Italy ........................53475-A

[52] U.S. Cl. .................................55/43, 55/48
[51] Int. Cl. ..................................B01d 19/00
[58] Field of Search ..............55/40, 44, 33, 56, 68, 73, 55/89, 93, 170, 468; 261/76

[56] References Cited

UNITED STATES PATENTS

| | | | |
|---|---|---|---|
| 2,926,753 | 3/1960 | Kohl et al. | 55/68 X |
| 3,233,388 | 2/1966 | Karwat et al. | 55/73 X |
| 3,313,093 | 4/1967 | Guggenberger et al. | 55/170 |
| 3,331,189 | 7/1967 | Worley | 55/73 |
| 3,455,144 | 7/1969 | Bradley | 261/76 X |
| 1,518,784 | 12/1924 | Gibson | 55/41 X |

*Primary Examiner*—Reuben Friedman
*Assistant Examiner*—R. W. Burks
*Attorney*—Sughrue, Rothwell, Mion, Zinn & Macpeak

[57] ABSTRACT

In removing gaseous impurities from a gas mixture under pressure with an absorption liquid which is regenerated in a low pressure zone an improvement comprises taking used absorption liquid from the pressurized absorption zone, expanding it in an ejector whereby a sub-atmospheric pressure is created, freeing contained gaseous impurities. Separation of gaseous impurities and liquid occurs, and separated liquid is subjected to the subatmospheric pressure of the ejector whereby further gaseous impurities are evolved, and returned to the absorption zone.

9 Claims, 8 Drawing Figures

GAS PURIFICATION PROCESS

This invention relates to methods for the elimination from gas mixtures of the impurities contained therein, such as carbon dioxide, hydrogen sulphide, hydrogen cyanide and sulphur dioxide, organic sulphur compounds, hydrocarbon gases, acetylene and benzene, separately or together, by an absorption stage carried out at above atmospheric pressure, in which the gas mixtures are washed with absorptive liquids of a suitable nature and chemical composition, which absorb the said impurities, and a regenerative stage carried out at a pressure substantially lower than that of the absorption stage and generally at atmospheric pressure, in which the absorbed impurities are removed from the said liquids, the latter then being re-cycled through the absorption stage.

The absorptive liquids employed in these processes fall basically into two categories:

a. The first category includes solutions which absorb the impurities by chemical reaction, such as solutions of alkaline carbonate, activated or not, ammoniacal solutions, solutions of phosphate, phenate or borate, solutions of amino-acid salts (Alkazid), solutions of ethanolamine or the like in water or organic solvents (sulpholene). These solutions are often used for absorbing impurities of an acid nature, such as carbon dioxide, hydrogen sulphide, hydrogen cyanide and the like, separately or together, these generally being recovered by boiling, but also in some cases by treatment with streams of inert gases or air (as, for example, with arsenite solutions).

b. The second category includes liquids which absorb the impurities by physical solubility, among which are basically water, methanol, solvent oils such as anthracene oil, for example, propylene carbonate and many of the organic solvents that have recently been suggested and come into use for the removal of carbon dioxide and hydrogen sulphide from various gases and especially from natural gas. In many cases, the regeneration of these liquids is achieved initially by expansion to atmospheric pressure of the exhausted liquid from the absorption stage and is then completed by boiling. In other cases, as, for instance, when water is used as the washing liquid, regeneration is completed by treating that liquid with air or other desorptive gases.

c. There is also the special case of oxidising processes, by which hydrogen sulphide is absorbed from the gas mixtures requiring scrubbing and is converted into elementary sulphur by oxidising treatment of the solution in the regenerative stage. As is well known, these processes employ arsenite/arsenate solutions, solutions of alkaline carbonates containing oxidation catalysts such as hydroquinone and vanadium compounds, iron salts and oxides, ferrocyanides and the like.

In the said processes, the absorptive liquid in cycle between the two stages is compressed by pumps or other mechanical means, which consume a considerable amount of power, this being one of the major cost items in the operation of the purifying process, especially when absorption is carried out at a particularly high pressure and when the gas to be scrubbed contains a high concentration of impurities, as in the case of carbon dioxide.

In certain cases only, in the present state of the art, the power consumed in cycling the liquid from one stage to the other is recovered in part by means of what are called recuperator turbines, to which the liquid is passed from the absorber under pressure.

It should be noted, however, that recuperation turbines have not become widely used, either because of their high cost or because of the fact that their characteristics are such that they can be used only in high-capacity plant, in which the amount of liquid generally exceeds 200–250 cu.m./h. In most cases, moreover, the nature of the absorptive solutions (such as, for example, the ethanolamines MEA, DEA and TEA and solutions of amino acids such as Alkazid), especially as regards the corrosive properties of the impurities to be removed, have been an argument against the use of recuperator turbines.

The purpose of the present invention is to recover part of the energy contained in the absorptive liquid after absorption has taken place, by means which can be employed in any type of purification plant, even those of small capacity, whatever be the type and nature of the absorptive liquid and whatever the corrosive properties of the impurities that are to be removed.

Another purpose is to utilise the energy thus recovered to improve the output and operation of the purification cycle itself, that is to say to facilitate and improve the expulsion of the impurities from the absorptive liquid during the regeneration stage.

Other purposes of the invention are, in the case in which the absorptive liquid is regenerated by boiling, to reduce the supply of heat necessary for operation of the cycle, to eliminate wholly or in part the heat exchange generally employed for heating the solution containing absorbent gaseous impurities with the regenerated solution and to improve and render more economic the equipment used in the present state of the art.

The present invention lies in the fact that the energy contained in the liquid coming from the absorber under pressure is utilised in an ejector, in passing through which the liquid creates a pressure drop, which is applied to the said liquid at suitable points in the purifying cycle, as indicated below, so as to promote the elimination therefrom of the absorbed impurities. In particular, the pressure reduction created by the ejector is applied:

1. to the liquid with absorbed gaseous impurities taken from the absorber, so that the expansion thereof may be prolonged until there is a sub-atmospheric pressure, created by the said ejector, thereby promoting the removal of the impurities contained in the liquid;

2. to the top of the regenerator column, enabling this to function more advantageously as lower pressure;

3. to the liquid issuing from the regenerator column or equipment, so as to improve and complete the removal of the impurities contained therein, a flow of steam being drawn in along with the impurities and being brought into direct contact with the liquid with absorbed gaseous impurities so as to heat it;

4. and, in the special case in which regeneration is effected by treatment of the absorptive liquid with air or other gases, the pressure drop created by the ejector is utilized to draw in that air or other gas and bring it into contact with the liquid.

These variants are applied individually or collectively, according to the various types of purification cycles and the nature of the absorptive liquid used; these are set out hereunder, with details of their practical application.

The following is a brief description of the drawings.

FIG. 1 illustrates an absorber A and a regenerating section of an ejector I, separating chamber B and expansion chamber D.

FIG. 2 further illustrates a regenerating zone with preheater H to heat the liquid before entering expansion chamber D, external heating means F in the expansion chamber and a cooler C above the expansion chamber.

1a

In the present state of the art, expansion of the liquid coming from the absorber under pressure is carried out (in successive stages or otherwise) down to the pressure of the regenerator column and in general as far as one atm, in suitable zones or flash chambers. During this expansion, the impurities dissolved in the liquid are removed until the conditions of solubility or equilibrium of these at one atm are reached.

According to the present invention, however, the liquid is expanded to a pressure which can be well below atmospheric, the pressure drop created as already mentioned by the ejector being utilized. Hence, there is better elimination of the impurities contained in the liquid, which, in many cases, is sufficient in industrial practice to enable the liquid to be returned directly to the absorption stage.

Figure 1:
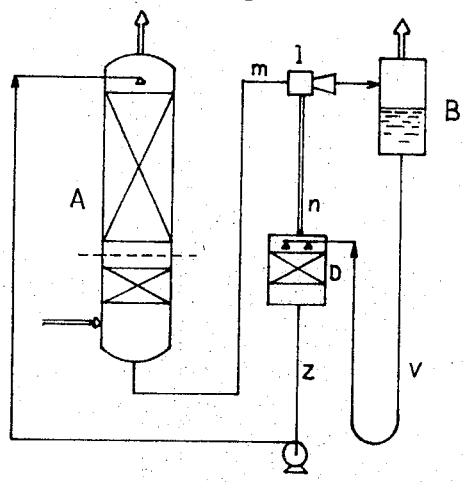

For the practical use of the proposed method, the arrangement shown in FIG. 1 is suggested, but obviously other analogous arrangements can be used, provided the liquid, after initial expansion through the ejector, be subsequently expanded down to the reduced pressure created by the ejector.

In FIG. 1, the liquid coming from the absorber A under pressure is fed to the ejector I, where it creates a pressure drop which, by way of the pipe $n$, takes effect in the chamber or zone D; then the liquid, having undergone initial expansion in the ejector, is passed to the separating chamber or zone B, where it is separated from the gaseous impurities produced by the liquid itself, which are discharged to the exterior. Finally, through the pipe $v$, the liquid is passed to the second expansion chamber D, where the pressure drop created by the ejector permits further elimination of the impurities, which are drawn through the pipe $n$. Finally, the liquid is withdrawn through the pipe $z$ and fed directly to the absorption stage or, as the case may be, to another chamber for further regeneration.

Figure 8:
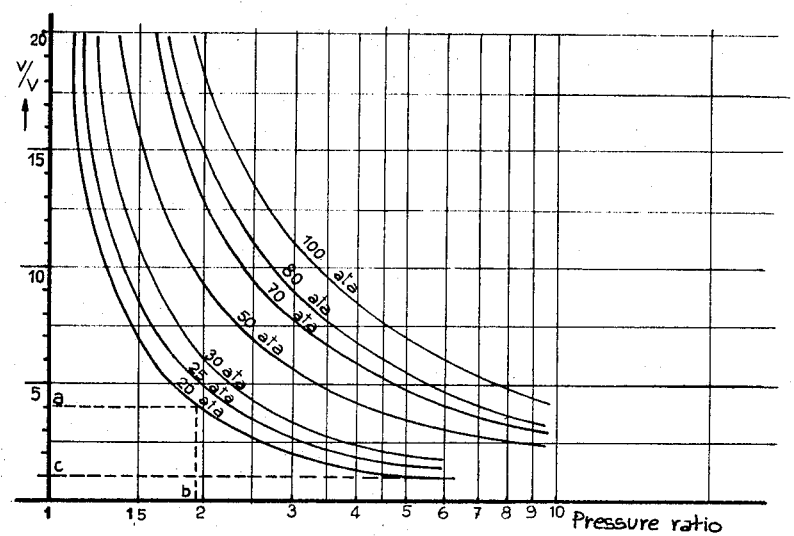
FIG. 8 is a chart of the ejector operating conditions correlating for various pressures of the liquid fed into the ejector the ratio of the volume of gaseous impurities which the ejector causes to be extracted from the liquid per volume of liquid passed through for the various ratios of the pressure established ahead of and beyond the ejector.

The degree of pressure drop created by the ejector, as will be further shown in section 4a and see FIG. 8, depends both on the pressure of the liquid containing absorbed gaseous impurities fed to the ejector and on the amount of gaseous impurities which the ejector causes to be extracted from the liquid in the second expansion.

Thus, for example, where water is used as the solvent in a carbon dioxide extraction plant operating at 25 atm, the water, after the initial expansion to atmospheric pressure through the ejector, has a residual carbon dioxide content which, also bearing in mind the temperature, may generally be taken to be two volumes of carbon dioxide to one volume of water. In that case (see FIG. 8), the ejector will be able to produce a reduction in pressure to $1/4.4 = 0.23$ atm; this represents a sufficient degree of vacuum for almost complete regeneration of the water.

A case of the practical application of this variant 1a is given in Example 1.

2a

Figure 2:
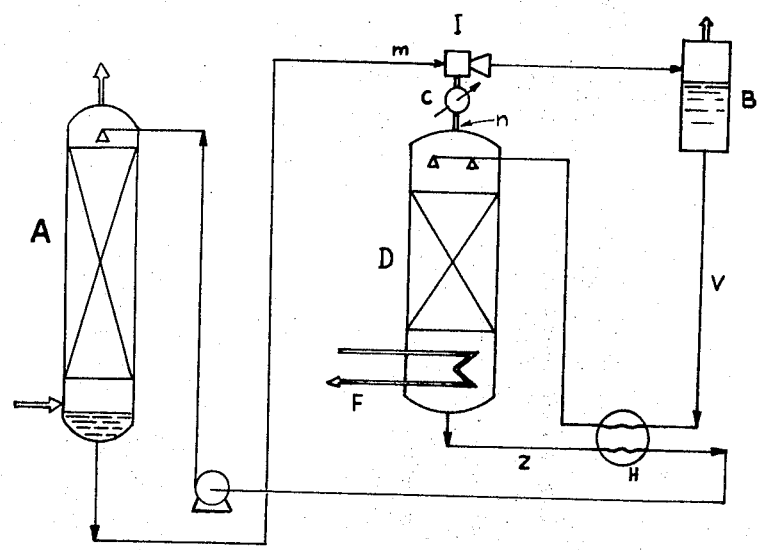

If the regeneration of the absorptive liquid produced by expansion to sub-atmospheric pressure as created by the ejector should be inadequate to achieve the purpose in view, the present invention employs and proposes the arrangement shown in FIG. 2 (or some other such arrangement), which is identical to that shown in FIG. 1, apart from the fact that the second expansion chamber D is operated at a higher temperature, possibly as high as boiling point, to facilitate expulsion of the gaseous impurities contained in the liquid.

In FIG. 2, the liquid from separation chamber B, which passes through the pipe $v$, is heated in the heater H by the hot liquid passing through the pipe $z$ from chamber D. The liquid so heated then passes to the top of chamber D, in which external heat is supplied by means of the heater F to heat the liquid to the temperature required for proper elimination of the impurities and for satisfactory regeneration. The liquid is then withdrawn by means of the pipe $z$ and, after passing through the heat exchanger H, is sent to the absorption stage.

As will be apparent to those skilled in the art, the elimination of the impurities from the liquid in the chamber D is facilitated by the raising of the temperature.

Should the liquid be heated to boiling point, the chamber D will assume the form of a regenerating column proper; and in that case it may be advantageous to use the cooler C (shown in broken line in the drawing), to condense the steam accompanying the gaseous impurities drawn from the ejector.

It will be noted that the boiling of the liquid in the chamber D takes place at a reduced temperature, because of the pressure drop created by the ejector, and this is advantageous not only on account of the dimensioning of the heat exchanger H (the difference in temperature between the absorption stage and the regeneration stage being smaller), but also because lower-temperature, cheaper external heating can be used in the heater F.

All of this is already known to technology, in which, in the case of plant operating at atmospheric temperature and employing sodium carbonate solutions for the removal of hydrogen sulphide from coking gas, use has been made of regenerator columns and equipment operating at sub-atmospheric pressure created by a vacuum pump.

The present invention, in which, on the other hand, absorption is carried out under pressure, substitutes for the vacuum pump the ejector already referred to, which has the advantage of eliminating the power consumption of the pump, but chiefly of replacing it with a low-cost piece of equipment free from maintenance costs, such as the ejector, which, having no moving parts, can be made from materials capable of resisting any kind of corrosion as well as from organic plastics materials.

A practical application of this variant 2a appears in Example 2.

1b

The variant described under 1a in reference to FIG. 1 may be suitably applied as an improvement on the methods described and proposed in U.S. Pat. application Ser. No. 841,526 filed 7-14-69.

In this, what was discussed and claimed was that the heat necessary for operation of the purifying cycle was supplied partly or entirely in the absorption stage by the gas mixture requiring purification, supplied for the purpose at high temperature.

Consequently, with particular reference to the use of ordinary or activated alkaline carbonate solutions, these solutions, after absorption, attain temperatures which may sometimes exceed 150° C., taking in heat that is subsequently used for eliminating the carbon dioxide and/or hydrogen sulphide contained in them, causing them to expand to the pressure of the regenerating column, that is to say, in general terms, to atmospheric pressure (with special reference to variant $b4$ in patent application Ser. No. 841,526, filed July 14, 1969.

The means proposed in the said patent application can be improved and made more efficient by use of the method given in variant 1a of the present invention (or analogous methods), whereby expansion can be prolonged advantageously down to the sub-atmospheric pressure created by the ejector.

In particular, the method of the present invention may be used to great advantage in the case of veriants $b1$ and $b3$ of the said patent application Ser. No. 841,526, filed July 14, 1969. In those variants, the solution passing down the absorber, as soon as it has absorbed a suitable amount of carbon dioxide and/or hydrogen sulphide and attained a suitably high temperature, is withdrawn from part way down the absorber (variant $b1$) or from the far end thereof (variant $b3$) and treated in a regenerating chamber in which the elimination of the carbon dioxide and/or hydrogen sulphide consumes the heat contained in the solution, which accordingly cools. The solution, thus cooled and partially regenerated, is returned to the absorber, in which it again absorbs further quantities of carbon dioxide and/or hydrogen sulphide and heat.

The method of the present process, as illustrated in FIG. 1, represents an improvement on those covered by the said patent application Ser. No. 841,526, filed July 14, 1969 by virtue of the fact that the solution, expanding by turns down to the sub-atmospheric pressure created by the ejector, eliminates the greater amount of carbon dioxide and/or hydrogen sulphide, but more especially is cooled to a greater extent, so that, upon returning to the absorber, it produces therein temperatures that are lower and more suitable for the efficiency of absorption, despite the fact that the mixture to be purified is fed in at a high temperature.

Figure 3:
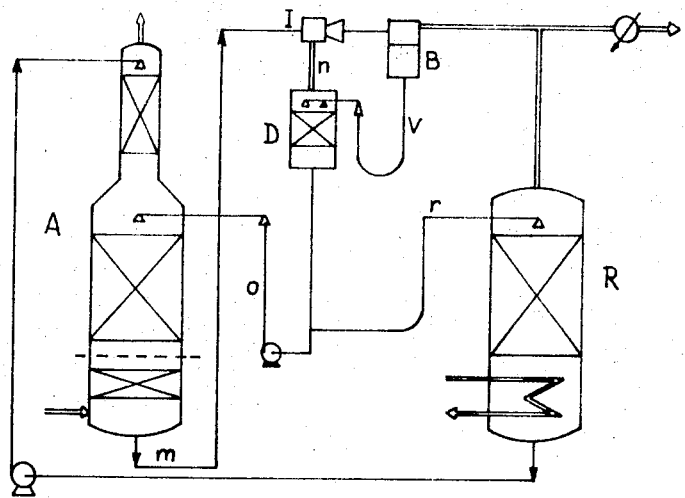
FIG. 3 illustrates a regenerating zone with an additional regenerating column R to further eliminate the impurities in the liquid stream.
Figure 7:
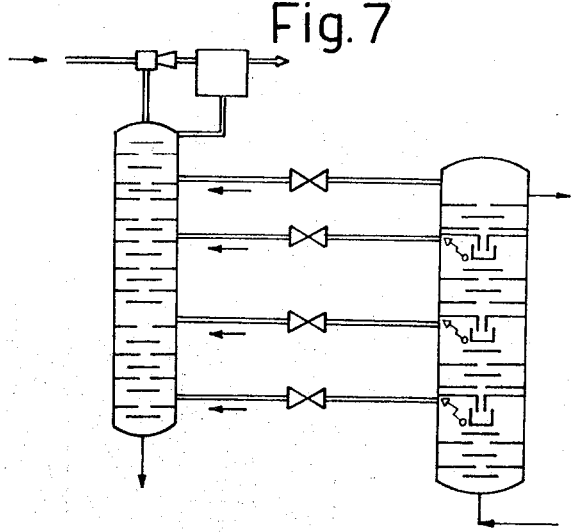
FIG. 7 illustrates the use of steam from the hot regenerated solution for heating successive stages of the cold liquid containing absorbed gaseous impurities.

FIG. 3 shows an example of the practical application of the present invention, relating to variant $b3$ and FIG. 7 in the said patent application Ser. No. 841,526, filed July 14, 1969.

The solution containing absorbed gaseous impurities, which emerges hot from the absorber under pressure through the pipe $m$, is passed through the ejector I, producing a pressure drop which takes effect, through the pipe $n$, in the chamber or zone D. Then the liquid, having undergone an initial expansion in the ejector, is passed into the separation chamber or zone B, where it is separated from the gaseous impurities accompanying it. Finally, through the pipe $v$, the liquid is passed to the second expansion chamber D, in which the pressure drop created by the ejector permits further elimination of the impurities, drawn through the pipe $n$. Finally, the solution is withdrawn from the chamber D and divided into two fractions: the first, through the pipe $r$, is taken to the regenerating column R, where it completes its regeneration and is passed to the top of the absorption column A; the second fraction, through the pipe $o$, is driven by a suitable pump to a point part way up the absorption column. This second fraction of the solution, which has undergone considerable cooling during the first and second expansions, returns to part way up the absorption column at a temperature which is lower and more suitable for establishing conditions of greater efficiency in the absorption column.

3a

This variant applies to the case in which the pressure reduction created by the ejector is applied to the liquid or the solution emerging from the regenerating column or equipment.

This variant is recommended where it is desired to obtain the greatest degree of pressure drop on the liquid and hence the greatest regeneration thereof.

As already stated, the extent of the pressure drop brought about by the ejector depends not only on the pressure of the liquid fed after absorption of the gaseous impurities to the ejector, but also on the amounts of gaseous impurities extracted from the liquid during the second expansion; it therefore reaches its maximum value when the liquid, after regeneration, contains only small residual amounts of impurities.

This is clearly shown in FIG. 8, which represents the ejector operating conditions.

The ordinates in that diagram represent the volumes of gaseous impurities extracted by the ejector per volume of liquid passed through it; the abscissae represent the ratio between the pressures established ahead of and beyond the ejector. Each curve in the diagram relates to the pressure, marked on the curve itself, of the liquid fed to the ejector. The efficiency of the latter is taken as 15 percent.

Thus, for example, if the pressure of the liquid is 20 atm and four volumes of gas per volume of liquid (point $a$ in the diagram) are extracted from the liquid, the ejector creates a pressure ratio of 1.94 (point $b$ in the diagram). If the ejector discharges at atmospheric pressure, that is equivalent to a pressure drop of $1/1.94 = 0.51$ atm.

If, on the other hand, as in the case of the present variant, the liquid has already been regenerated and the ejector extracts from it only one volume of gas per volume of liquid (point $c$ in the diagram), the resultant pressure ratio is 5.5 (point $d$ in the diagram), or a vacuum of 0.183 atm.

Still higher degrees of vacuum can be readily obtained if required and this makes it possible to achieve practically complete elimination of the gaseous impurities contained in the absorptive liquid and hence a high degree of purification of the gas mixtures to be treated.

This variant, based on what has been stated above, is applied in industrial practice in accordance with FIGS. 5 and 6, which will now be described, but obviously other similar arrangements can also be used.

Figure 5:
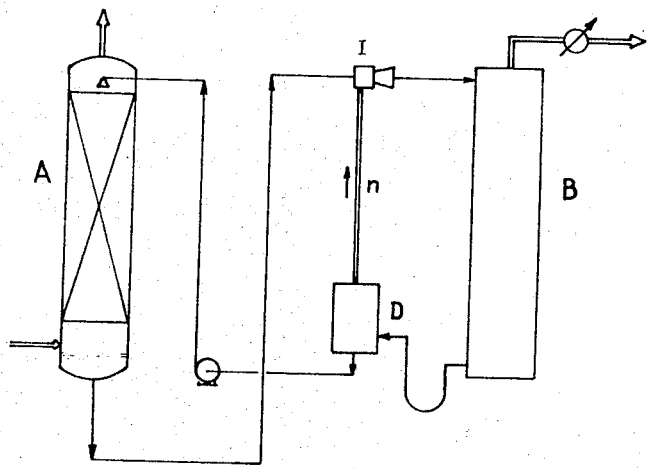
FIG. 5 illustrates a regeneration section containing ejector I, regenerating chamber B and expansion chamber D.

In FIG. 5, liquid containing absorbed gaseous impurities coming from the absorber A under pressure is fed to the ejector I, where it creates a pressure drop in the chamber or zone D drawing the gaseous impurities extracted from the liquid therein through the pipe $n$. The liquid leaving the ejector is then sent to the top of the regenerating chamber B, where the impurities it carries are separated and discharged to the outside. In this regenerating chamber or zone B, the liquid is regenerated by any of the methods known to technology.

Finally, the regenerated liquid withdrawn from the chamber B is fed to the second expansion chamber D, where the pressure drop brought about by the ejector eliminates a further quantity of gaseous impurities through the pipe $n$; the liquid thus brought to an advanced stage of regeneration is returned to the absorber A by a suitable pump.

Thus, for example, where water is used as the absorptive liquid, the chamber B generally consists of a tower provided with charging equipment, in which the water is caused to expand in counterflow to a rising current of air, which eliminates the gaseous impurities previously absorbed by the water.

In most cases, however, the chamber B consists of a regenerating column, in which the liquid is regenerated by boiling by means of heat supplied from outside. FIG. 6 shows a case of practical application with fuller details and information.

The liquid from the absorber under pressure, which is fed to the ejector I, then passes through the chamber E, the purpose of which is to bring that liquid into intimate contact with the gaseous impurities drawn from the chamber D in company with large quantities of steam. The object of this is to heat the liquid.

Then the liquid is introduced into the regenerating column R, in which the gaseous impurities carried along by it are separated and discharged to the outside, while the liquid, passing down the column, is regenerated therein by boiling, outside heat being applied.

Finally, the liquid is withdrawn from the regenerating column and fed to the pre-expansion chamber C, which is in direct communication, through the pipe $m$, with the top of the regenerating column, which is, of course, at a lower pressure than the bottom of the column. The object of this is to enable the steam thus generated by the solution to heat the solution containing absorbed gaseous impurities more conveniently at the top of the regenerator.

The liquid is then fed to the secondary expansion chamber or zone D, in which the pressure drop created by the ejector I extracts from it a further quantity of gaseous impurities, accompanied by steam. The liquid, thus fully regenerated and also cooled, is driven to the absorber A by the pump P.

This arrangement can be used for any type of absorptive liquid and, as already stated, for any method of regeneration known to technology.

Figure 6:
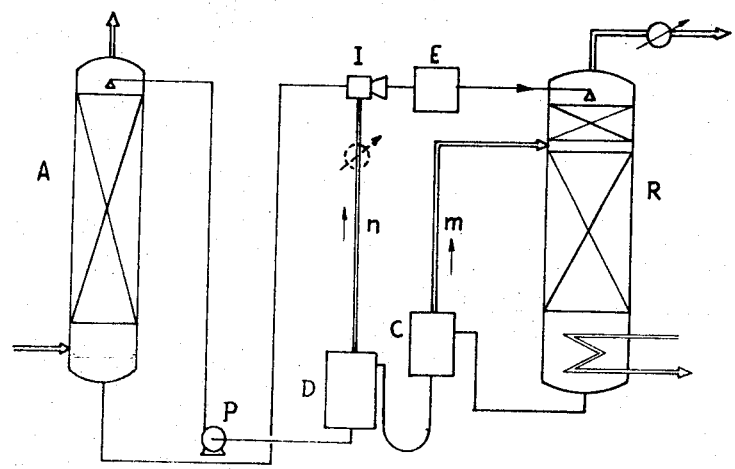
FIG. 6 illustrates a regeneration section with an additional heating chamber E, external heating means in the regeneration column R, a pre-expansion chamber C and the optional use of the cooler between expansion chamber D and ejector I.

In the present variant, however, the arrangement in FIG. 6 and already described is more appropriate for use with liquids and solutions regenerated by boiling, which are accordingly removed hot or boiling from the regenerating zone and have a heat content that can be usefully employed in the chamber D to facilitate elimination of the gaseous impurities by the pressure drop created by the ejector.

This utilisation of the heat in the hot and boiling solutions is the object of U.S. application, Ser. No. 865,852. The claims in that application provide for the extraction of a flow of steam by various methods from the hot or boiling regenerated solution, for the purpose of removing from it part of the carbon dioxide and/or other acid gases still contained therein and also, in the cases duly considered in that application of using that flow of steam to heat the colder exhausted solution coming from the absorption column, thereby eliminating the use of a heat exchanger between the solution containing absorbed impurities and the hot solution, such as is commonly employed in the present state of the art.

The present invention claims the use of the ejector in accordance with the foregoing, as one of the methods suitable for the application of the said patent applications, which, as regards the use of the ejector, should be deemed to be linked to the present patent application.

In this case too, as stated in the aforesaid patent, the use of the ejector differs according to whether solutions are being used in which the flow of steam extracts appreciable quantities of gaseous impurities (as in the case of well activated solutions of alkaline carbonate or only slightly regenerated solutions) or whether it extracts mainly steam (as in the case of non-activated solutions already regenerated to a large extent).

In the first case, it is desirable to achieve the result of regenerating the solution as far as possible, eliminating from it the greatest possible quantity of gaseous impurities, and it is therefore recommended that the flow of steam and gaseous impurities drawn in by the ejector be cooled with the aid of a cooler, so as to condense the steam and thus increase the pressure drop exerted by the ejector.

In the second case, on the other hand, the most important aim is to heat, with the steam extracted, the solution containing absorbed gaseous impurities that has done work in the ejector, thereby dispensing entirely or partially with the heat exchanger; in such circumstances, of course, the cooler suggested in the first instance is not to be recommended.

The use of the ejector is therefore recommended also when it is desired that the hot regenerated solution should produce the flow of steam in successive stages, the cold solution containing absorbed gaseous impurities receiving that flow of steam in respective corresponding successive stages, as shown in FIG. 7, which is similar to FIG. 7 in U.S. patent application Ser. No. 865,852. The purpose of this is obviously to heat the solution containing absorbed gaseous impurities as much as possible, that is to say up to a temperature fairly close to the initial temperature of the hot regenerated solution. Such a result, however, as is well known to those skilled in the art, can also be achieved in various other ways, such as, for example, by the use of multiple ejectors in successive stages.

For a practical application of the present variant, reference may be made, as regards what has been stated in the foregoing, to Example 3 given in U.S. patent application Ser. No. 865,852. Another practical application is given in Example 3.

4a

This variant relates to the case in which the ejector takes in air or other gases and brings them into contact with the liquid issuing from the ejector, to assist the operation of the cycle.

Of all the cases in which this variant can be used, special importance attaches to that concerning the oxidation processes employed in the desulphuretting of gas mixtures. These, as is well known, involve the operating cycle shown in FIG. 4.

The liquid containing absorbed gaseous impurities is withdrawn from the base of the absorption column A, which operates under pressure, and is passed to the regenerating and oxidising chamber B, filled with solution which is treated with air injected at the base, the oxygen in which acts on the solution, oxidizing it and converting the hydrogen sulphide previously absorbed into elementary sulphur. This, as is well known, is floated away by the stream of air and separated in spray form, which is collected at the top, in the funnel portion of the oxidizing chamber.

The application of the present variant modifies the said arrangement so that the exhausted liquid emerging from the absorption column A is fed to the ejector I, which draws air through the pipe d and feeds it, along with the liquid treated in the injector, to the bottom of the oxidation chamber B.

Example 4 illustrates one practical application of the present variant 4a.

EXAMPLE 1

In a conventional installation for the removal of carbon dioxide from natural gas by washing with water, operating at a pressure of 45 atm, the water, as it leaves the absorption column, is caused to expand to atmospheric pressure in a suitable expansion chamber, with the elimination of carbon dioxide. The water is then sent to the top of a tower fitted with wooden screens, in counterflow to rising air, in which the water completes its regeneration.

This conventional installation is modified by adoption of the arrangement shown in FIG. 1 of the drawings accompanying this application.

In accordance with FIG. 8, the ejector operating at 45 atm and removing from the absorptive liquid a maximum of two volumes of carbon dioxide per volume of water, creates a pressure drop of about 9.6, which means that in the second expansion chamber there will be a vacuum equivalent to $1/9.6 = 0.104$. In these conditions, the residual content of carbon dioxide in the water drops considerably, so that the water is able to purify the gas mixture down to a carbon dioxide content of 0.2 to 0.3 percent.

There is the further advantage that the water circulating in this scrubbing plant, after modification, no longer contains dissolved oxygen due to its treatment with air.

EXAMPLE 2

This example concerns the application of the FIG. 1 arrangement of the present invention to the elimination of carbon dioxide from a gas derived from partial combustion installations, with a 31 percent content of carbon dioxide, at a pressure of 100 atm. In particular, it concerns the case in which the heat necessary for the purification cycle is supplied in the absorption stage by the gas mixture that is to be purified, which is supplied sufficiently hot, and in which the solution, heated during absorption to a temperature of 150° C., is expanded to atmospheric pressure, eliminating its content of carbon dioxide and consuming for that purpose the heat possessed by the solution. More particularly, this example concerns an improvement on variant B4 described in Example 3 and illustrated in FIG. 8 of patent application Ser. No. 841,526, filed July 14, 1969.

The solution containing absorbed gaseous impurities is withdrawn from the base of the absorption column at a temperature of 150° C., as in the case referred to above. It is then passed to the ejector I, where it expands to one atm, creating a pressure drop which acts on the second expansion chamber D, the arrangement and details being similar to those already described in reference to FIG. 1.

The pressure drop created by the ejector in the chamber D is amply sufficient to cool the solution to 95° C., the advantage being that the solution is returned to the top of the absorber without the need for the intermediate cooler provided in Example 3 of patent application Ser. No. 841,526, filed July 14, 1969.

At the same time, the solution gives up further successive amounts of carbon dioxide, so that its degree of carbonation improves to 2 percent. This considerably improves the purification of the gas. Vice versa, by dispensing with this improvement in gas purification, one can reduce the amount of heat supplied by the heater.

EXAMPLE 3

This example concerns the removal of hydrogen sulphide from a gas containing approximately 10 g./cu.m. of hydrogen sulphide and 3 percent of carbon dioxide, working at a pressure of 25 atm.

The absorptive liquid used is a soda solution containing about 2 percent of sodium carbonate. Absorption takes place in a plate type absorption column at a temperature of about 35° to 40° C.

The purification cycle is shown in FIG. 2, in which the regeneration of the absorptive liquid is assumed to be completed by boiling in the regenerating column D.

The absorptive solution leaving the column is passed to the ejector I , creating a pressure drop which acts on the regenerating column D , and is then fed into the separating chamber B , where the gaseous impurities carried by the liquid are separated and discharged at the top. The liquid is withdrawn from the chamber B through the pipe v and heated in the heat exchanger H by the heat of the solution leaving the regenerating column D through the pipe z . The liquid is sent to the head of the regenerating column D , at the bottom of which it is raised to boiling point by outside heat supplied by the heater F . This heat supply amounts to about 60 kg. of steam per cu.m. of solution. The gaseous impurities removed in the column are drawn in by the ejector I , so that the pressure in the column is 625 mm. Hg. The regenerated liquid is finally returned to the absorption stage by a suitable pump.

EXAMPLE 4

Figure 4:
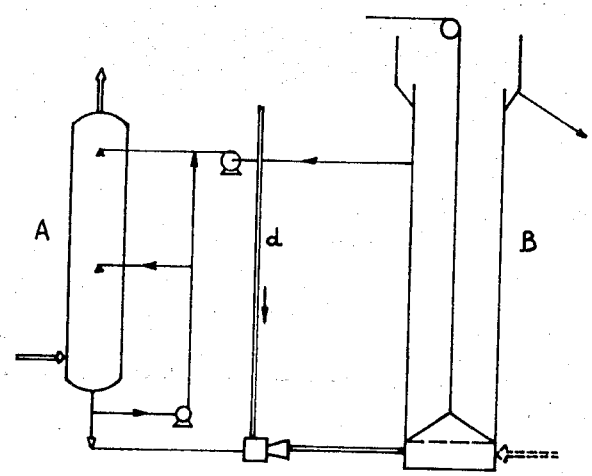
FIG. 4 illustrates regeneration of the liquid in oxidizing chamber B in which air or oxygen is drawn through pipe d to be mixed with the liquid.

An installation for desulphuretting natural gas, operating at a pressure of 45 atm and arranged similarly to that shown in FIG. 4, employs an arsenite/arsenate solution. This is withdrawn from the base of the absorption column, in which the absorption conditions are such that 1 kg. of hydrogen sulphide per cu.m. of solution has been removed.

The consumption of oxidising air, when such an aresnite/arsenate solution is used, is known to be about 5.0 cu.m. per kg. of hydrogen sulphide, so that in this instance it is 5.0 cu.m. of air per cu.m. of solution.

According to FIG. 8, this volume of air can be drawn in by 1 cu.m. of liquid fed to the ejector, at a pressure of 45 atm, when the ratio between the pressures ahead of and beyond the ejector is approximately 3:1.

Hence, if the oxidizing chamber is filled with liquid to a height of 20 m., as is normal in industrial practice, all the air necessary to oxidize the solution and to convert the hydrogen sulphide to elementary sulphur is supplied without cost to the ejector.

EXAMPLE 2a

This example concerns the elimination of carbon dioxide from a gas mixture at 18.5 atm with an initial content of 20.5 percent of carbon dioxide, using a solution of potassium arsenite (200 g./l. of $K_2O$ and 140 g./l. of $As_2O_3$).

With reference to FIG. 6, the solution is withdrawn from the base of the absorption column at a temperature of 98° C. and with a degree of carbonation amounting to 62 percent. This is passed directly to the ejector I , where it creates a pressure drop, which acts on the chamber D , as explained hereunder. Then the liquid is fed to the regenerating column R . It should be noted that in this particular instance the mixing chamber E is not necessary, there being no need to heat the solution containing absorbed impurities with the heat extracted from the regenerated solution.

There the solution is regenerated until the degree of carbonation reaches 29 percent, by supplying 23 kg. of steam per cu.m. of solution. At the base of the column, this has a temperature of 102° C., corresponding to the pressure of 1.2 atm existing there. Then the solution is fed into the chamber D (and in this case it should also be noted that the first expansion chamber C is not required).

The solution in chamber D undergoes the pressure drop created by the ejector and emits a flow of steam plus carbon dioxide, the degree of carbonation becoming 19 percent and cooling taking place to 88° C.

The flow of steam and carbon dioxide is cooled beforehand, before being sent to the ejector, by the cooler shown in broken line in the drawing, so as to condense the steam and increase the degree of vacuum exerted by the said ejector.

It has been found in practice that the pressure drop created by the ejector in the said conditions is 0.63 atm.

The liquid is withdrawn from the chamber D at 88° C. and is passed at that temperature to the top of the absorption column A , in which it purifies the gas down to a carbon dioxide content of 0.90 percent.

In passing down the absorption column, the solution is heated to 98° C. and absorbs 20.5 volumes of carbon dioxide per volume of solution. It should be mentioned that the heat supplied to the reboiler of the regenerating column R is 640 kcal. per cu.m. N of carbon dioxide removed.

I claim:

1. In a continuous process for removing gaseous impurities contained in a gaseous mixture comprising absorbing the gaseous impurities in an absorbent liquid in a pressurized absorption zone by intimately and directly contacting the gaseous mixture with the absorbent liquid, regenerating the absorbent liquid having the gaseous impurities absorbed therein in a regeneration zone operating at a pressure lower than that existing in the absorption zone by expulsion of the previously absorbed gaseous impurities from the absorbent liquid, and recycling the regenerated absorbent liquid to the absorption zone, the improvement which comprises:

a. removing the absorbent liquid with the absorbed gaseous impurities from the pressurized absorption zone and, prior to introducing the absorbent liquid into the regeneration zone, passing said liquid through an ejector to expand said liquid, said passage of liquid through the ejector creating a sub-atmospheric pressure in an expansion zone of the regeneration zone communicating with the ejector;

b. introducing the expanded liquid into a separating zone whereby at least part of the absorbed gaseous impurities are separated from the absorbent liquid;

c. removing the at least partially regenerated absorbent liquid from the separating zone and introducing the at least partially regenerated absorbent liquid into said expansion zone, whereby further absorbed gaseous impurities in the absorbent liquid, subjected to the sub-atmospheric pressure existing in the expansion zone, are removed from the absorbent liquid and drawn into the ejector; and d. removing the gaseous impurities from the system.

2. In a continuous process for removing gaseous impurities contained in a gaseous mixture comprising absorbing the gaseous impurities in an absorbent liquid in a pressurized absorption zone by intimately and directly contacting the gaseous mixture with the absorbent liquid, regenerating the absorbent liquid having the gaseous impurities absorbed therein in a regeneration zone operating at a pressure lower than that existing in the absorption zone by expulsion of the previously absorbed gaseous impurities from the absorbent liquid, and recycling the regenerated absorbent liquid to the absorption zone, the improvement which comprises:

a. removing the absorbent liquid with the absorbed gaseous impurities from the pressurized absorption zone and, prior to introducing the absorbent liquid into the regeneration zone, passing said liquid through an ejector to expand said liquid, said passage of liquid through the ejector creating a sub-atmospheric pressure in an expansion zone of the regeneration zone communicating with the ejector;

b. introducing the expanded liquid into a separating zone whereby at least part of the absorbed gaseous impurities are separated from the absorbent liquid;

c. removing the at least partially regenerated absorbent liquid from the separating zone and introducing the at least partially regenerated absorbent liquid into said expansion zone, whereby further absorbed gaseous impurities in the absorbent liquid, subjected to the sub-atmospheric pressure existing in the expansion zone, are removed from the absorbent liquid and drawn into the ejector;

d. removing the absorbent liquid from the expansion zone and introducing said absorbent liquid into an additional regeneration zone, wherein further qualities of said gaseous impurities are removed from the absorbent liquid; and e. removing the gaseous impurities from the system.

3. In a continuous process for removing gaseous impurities contained in a gaseous mixture comprising absorbing the gaseous impurities in an absorbent liquid in a pressurized absorption zone by intimately and directly contacting the gaseous mixture with the absorbent liquid, regenerating the absorbent liquid having the gaseous impurities absorbed therein in a regeneration zone operating at a pressure lower than that existing in the absorption zone by expulsion of the previously absorbed gaseous impurities from the absorbent liquid, and recycling the regenerated absorbent liquid to the absorption zone, the improvement which comprises:

a. removing the absorbent liquid with the absorbed gaseous impurities from the pressurized absorption zone and, prior to introducing the absorbent liquid into the regeneration zone, passing said liquid through an ejector to expand said liquid, said passage of liquid through the ejector creating a sub-atmospheric pressure in an expansion zone of the regeneration zone communicating with the ejector;

b. introducing the expanded liquid into a separating zone whereby at least part of the absorbed gaseous impurities are separated from the absorbent liquid;

c. removing the absorbent liquid from the separating zone and passing it to a preheating zone where the absorbent liquid is preheated by the absorbent liquid emerging from the expansion zone;

d. passing the absorbent liquid from said preheating zone to the expansion zone whereby further absorbed gaseous impurities in the absorbent liquid, subjected to the sub-atmospheric pressure of the expansion zone, are removed from the absorbent liquid and drawn into the ejector;

e. heating the absorbent liquid in said expansion zone by supplying heat from outside said expansion zone;

f. removing the heated absorbent liquid from said expansion zone and passing it to said preheating zone whereby the absorbent liquid derived from the separating zone is heated;

g. passing the absorbent liquid from said preheating zone to the pressurized absorption zone; and h. removing the gaseous impurities from the system.

4. In a continuous process for removing gaseous impurities contained in a gaseous mixture comprising absorbing the gaseous impurities in an absorbent liquid in a pressurized absorption zone by intimately and directly contacting the gaseous mixture with the absorbent liquid, regenerating the absorbent liquid having the gaseous impurities absorbed therein in a regeneration zone operating at a pressure lower than that existing in the absorption zone by expulsion of the previously absorbed gaseous impurities from the absorbent liquid, and recycling the regenerated absorbent liquid to the absorption zone, the improvement which comprises:

a. removing the absorbent liquid with the absorbed gaseous impurities from the pressurized absorption zone and, prior to introducing the absorbent liquid into the regeneration zone, passing said liquid through an ejector to expand said liquid, said passage of liquid through the ejector creating a sub-atmospheric pressure in an expansion zone of the regeneration zone communicating with the ejector;

b. introducing the expanded liquid into a separating zone whereby at least part of the absorbed gaseous impurities are separated from the absorbent liquid;

c. removing the absorbent liquid from the separating zone and passing it to a preheating zone where the absorbent liquid is preheated by the absorbent liquid emerging from the expansion zone;

d. passing said preheated absorbent liquid to the expansion zone;

e. supplying external heat to the absorbent liquid in the expansion zone to bring it to its boiling point whereby the absorbed gaseous impurities contained in the absorbent liquid are eliminated therefrom by means of vapors produced by the boiling in said expansion zone and, subjected to the sub-atmospheric pressure existing in the expansion zone, removed from the absorbent liquid and drawn into the ejector;

f. removing the heated absorbent liquid from said expansion zone and passing it to said preheating zone whereby the absorbent liquid derived from the separating zone is heated;

g. passing the absorbent liquid from said preheating zone to the pressurized absorption zone; and h. removing the gaseous impurities from the system.

5. In a continuous process for removing gaseous impurities contained in a gaseous mixture comprising absorbing the gaseous impurities in an absorbent liquid in a pressurized absorption zone by intimately and directly contacting the gaseous mixture with the absorbent liquid, regenerating the absorbent liquid having the gaseous impurities absorbed therein in a regeneration zone operating at a pressure lower than that existing in the absorption zone by expulsion of the previously absorbed gaseous impurities from the absorbent liquid, and recycling the regenerated absorbent liquid to the absorption zone, the improvement which comprises:

a. removing the absorbent liquid with the absorbed gaseous impurities from the pressurized absorption zone and, prior to introducing the absorbent liquid into the regeneration zone, passing said liquid through an ejector to expand said liquid, said passage of liquid through the ejector creating a sub-atmospheric pressure in an expansion zone of the regeneration zone communicating with the ejector;

b. introducing the expanded liquid into a first regeneration zone whereby at least part of the absorbed gaseous impurities are separated from the absorbent liquid;

c. removing the at least partially regenerated absorbent liquid from the first regeneration zone and introducing the at least partially regenerated absorbent liquid into said expansion zone, whereby further absorbed gaseous impurities in the absorbent liquid, subjected to the sub-atmospheric pressure existing in the expansion zone, are removed from the absorbent liquid and drawn into the ejector; and d. removing the gaseous impurities from the system.

6. In a continuous process for removing gaseous impurities contained in a gaseous mixture comprising absorbing the gaseous impurities in an absorbent liquid in a pressurized absorption zone by intimately and directly contacting the gaseous mixture with the absorbent liquid, regenerating the absorbent liquid having the gaseous impurities absorbed therein in a regeneration zone operating at a pressure lower than that existing in the absorption zone by expulsion of the previously absorbed gaseous impurities from the absorbent liquid, and recycling the regenerated absorbent liquid to the absorption zone, the improvement which comprises:

a. removing the absorbent liquid with the absorbed gaseous impurities from the pressurized absorption zone and, prior to introducing the absorbent liquid into the regeneration zone, passing said liquid through an ejector to expand said liquid, said passage of liquid through the ejector creating a sub-atmospheric pressure in an expansion zone of the regeneration zone communicating with the ejector;

b. extracting, by means of the sub-atmospheric pressure created by the ejector, vapor and gaseous impurities from said expansion zone into the ejector;

c. bringing said vapor into direct contact with the absorbent liquid passed through the ejector in a heating zone whereby the absorbent liquid is heated and the vapor is condensed;

d. passing said absorbent liquid into the regenerating zone and heating it to boiling therein by supplying external heat;

e. eliminating gaseous impurities contained in the absorbent liquid by means of vapors produced by said boiling;

f. removing the hot, boiling absorbent liquid from the regenerating zone and passing it to the expansion zone, whereby more of the absorbed gaseous impurities and vapors from the absorbent liquid being subjected to the sub-atmospheric pressure of the expansion zone are removed from the absorbent liquid and drawn into the ejector, and g. removing the gaseous impurities from the system.

7. In a continuous process for removing gaseous impurities contained in a gaseous mixture comprising absorbing the gaseous impurities in an absorbent liquid in a pressurized absorption zone by intimately and directly contacting the gaseous mixture with the absorbent liquid, regenerating the absorbent liquid having the gaseous impurities absorbed therein in a regeneration zone operating at a pressure lower than that existing in the absorption zone by expulsion of the previously absorbed gaseous impurities from the absorbent liquid, and recycling the regenerated absorbent liquid to the absorption zone, the improvement which comprises:

a. removing the absorbent liquid with the absorbed gaseous impurities from the pressurized absorption zone and, prior to introducing the absorbent liquid into the regeneration zone, passing said liquid through an ejector to expand said liquid, said passage of liquid through the ejector creating a sub-atmospheric pressure in an expansion zone of the regeneration zone communicating with the ejector;

b. passing said absorbent liquid into the regenerating zone and heating it to boiling by supplying external heat thereto;

c. eliminating the gaseous impurities contained therein by means of vapors produced by boiling;

d. removing the hot and boiling liquid from the regenerating zone and passing it into the expansion zone, whereby further absorbed gaseous impurities in the absorbent liquid, subjected to the sub-atmospheric pressure of the expansion zone, are removed from the absorbent liquid and drawn toward the ejector;

e. removing a stream of vapor and gaseous impurities from said expansion zone and cooling said stream whereby the vapor is condensed and the residual gaseous impurities are passed to the ejector; and f. removing the gaseous impurities from the system.

8. In a process of purifying gaseous mixtures and of eliminating and recovering gaseous impurities therein by means of an absorbent liquid which is caused to circulate between an absorption zone functioning under pressure and in which the absorbent liquid is brought into intimate and direct contact with the gaseous mixture and eliminating the gaseous impurities contained therein, and a regenerating zone functioning under a pressure substantially below that of absorption and in which the liquid is regenerated by expulsion, the improvement which comprises:

extracting the absorbent liquid containing the gaseous impurities therein from the pressurized absorption zone, passing said absorbent liquid into an ejector thereby creating a sub-atmospheric pressure in a conduit connected to the ejector, drawing in through said conduit air or other gases, passing the absorbent liquid originating from the ejector together with said air or other gases into the regenerating zone, contacting said air or other gases with the absorbent liquid in said regenerating zone and eliminating the gaseous impurities contained in the absorbent liquid and removing the gaseous impurities from the system.

9. The process of claim 8 wherein the liquid is regenerated by transformation of the gaseous impurities previously absorbed.

* * * * *